(12) United States Patent
Yamamoto

(10) Patent No.: US 9,686,445 B2
(45) Date of Patent: Jun. 20, 2017

(54) METHOD AND SYSTEM FOR DYNAMICALLY PRODUCING COLOR VALIDATION PATCHES

(71) Applicant: KONICA MINOLTA LABORATORY U.S.A., INC., San Mateo, CA (US)

(72) Inventor: Kazuto Yamamoto, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/871,108

(22) Filed: Sep. 30, 2015

(65) Prior Publication Data
US 2017/0094125 A1    Mar. 30, 2017

(51) Int. Cl.
G06K 1/00 (2006.01)
H04N 1/60 (2006.01)

(52) U.S. Cl.
CPC ......... *H04N 1/6027* (2013.01); *H04N 1/6033* (2013.01); *H04N 1/6075* (2013.01); *H04N 2201/0094* (2013.01)

(58) Field of Classification Search
None
See application file for complete search history.

(56) References Cited

U.S. PATENT DOCUMENTS

2004/0114165 A1*  6/2004  Nakajima ............ H04N 1/6033
                                             358/1.9
2014/0036284 A1*  2/2014  Matsuzaki ............... H04N 1/60
                                             358/1.9

* cited by examiner

*Primary Examiner* — John Wallace
(74) *Attorney, Agent, or Firm* — Buchanan Ingersoll & Rooney PC

(57) ABSTRACT

An image forming apparatus, a method, and a computer readable medium are disclosed for generating color patches for color validation of a print engine of an image forming apparatus. The method includes acquiring a validation result on a first color validation chart with a sensing device, the sensing device configured to read a color validation chart, the color validation chart having one or more color patches, and wherein the validation result compares a color accuracy of each of the one or more color patches from the first color validation chart to a target color; and determining an order of each of the color patches in a second color validation chart to be printed based on the validation result on the first color validation chart, wherein the order of the color patches in the second color validation chart is determined based on color patches that do not match the target color.

21 Claims, 5 Drawing Sheets

METHOD AND SYSTEM FOR DYNAMICALLY PRODUCING COLOR VALIDATION PATCHES

FIELD OF THE INVENTION

The present disclosure generally relates to a method and system for dynamically producing color patches on color measurement pages, which can be used in color validation of color printers, multi-function peripherals (MFP) and/or image forming apparatuses.

BACKGROUND OF THE INVENTION

Maintaining consistent and uniform tones is a desired goal in image forming apparatus and devices. For example, it can be desirable for an image to appear the same no matter which rendering system renders the image and no matter how many times an image is rendered on a particular system. The image should exhibit, for example, the same lightness or hue each time it is rendered on a given system and no matter on which system it is rendered. For this reason, rendering engines, such as print engines in a printing system, are put through a validation process in order to evaluate whether the print engines realize appropriate color reproducibility.

In the color validation process, a plurality of color measurement pages, each of the plurality of color measurement pages having a plurality of color patches, are printed and measured by a measuring device, for example, a color sensing device in the image forming apparatus, and then each of colors measured by the measuring device is compared with a corresponding target color.

If one of the measured colors does not match the corresponding target color, color corrections can then be made to the image forming apparatus.

As for a high-end printer in which high color reproducibility is required, thousands of color patches can be printed in one color validation process, and the validation process can be repeated with a short interval.

SUMMARY OF THE INVENTION

Accordingly, it would desirable to avoid, for example, paper waste and use of toner and/or ink in a validation process.

An image forming apparatus is disclosed, comprising: a sensing device configured to read a color validation chart, the color validation chart having one or more color patches; and a processor configured to: acquire a validation result on a first color validation chart from the sensing device, wherein the validation result compares a color accuracy of each of the one or more color patches from the first color validation chart to a target color; and determine an order of each of the color patches in a second color validation chart to be printed based on the validation result on the first color validation chart, wherein the order of the color patches in the second color validation chart is determined based on one or more color patches that do not match the target color.

A method is disclosed for dynamically generating color patches for color validation of a print engine of an image forming apparatus, the method comprising: acquiring a validation result on a first color validation chart with a sensing device, the sensing device configured to read a color validation chart, the color validation chart having one or more color patches, and wherein the validation result compares a color accuracy of each of the one or more color patches from the first color validation chart to a target color; and determining an order of each of the color patches in a second color validation chart to be printed based on the validation result on the first color validation chart, wherein the order of the color patches in the second color validation chart is determined based on one or more color patches that do not match the target color.

A non-transitory computer readable recording medium stored with a computer readable program code for dynamically generating color patches for color validation of a print engine of an image forming apparatus is disclosed, the computer readable program code configured to execute a process comprising: acquiring a validation result on a first color validation chart with a sensing device, the sensing device configured to read a color validation chart, the color validation chart having one or more color patches, and wherein the validation result compares a color accuracy of each of the one or more color patches from the first color validation chart to a target color; and determining an order of each of the color patches in a second color validation chart to be printed based on the validation result on the first color validation chart, wherein the order of the color patches in the second color validation chart is determined based on one or more color patches that do not match the target color.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
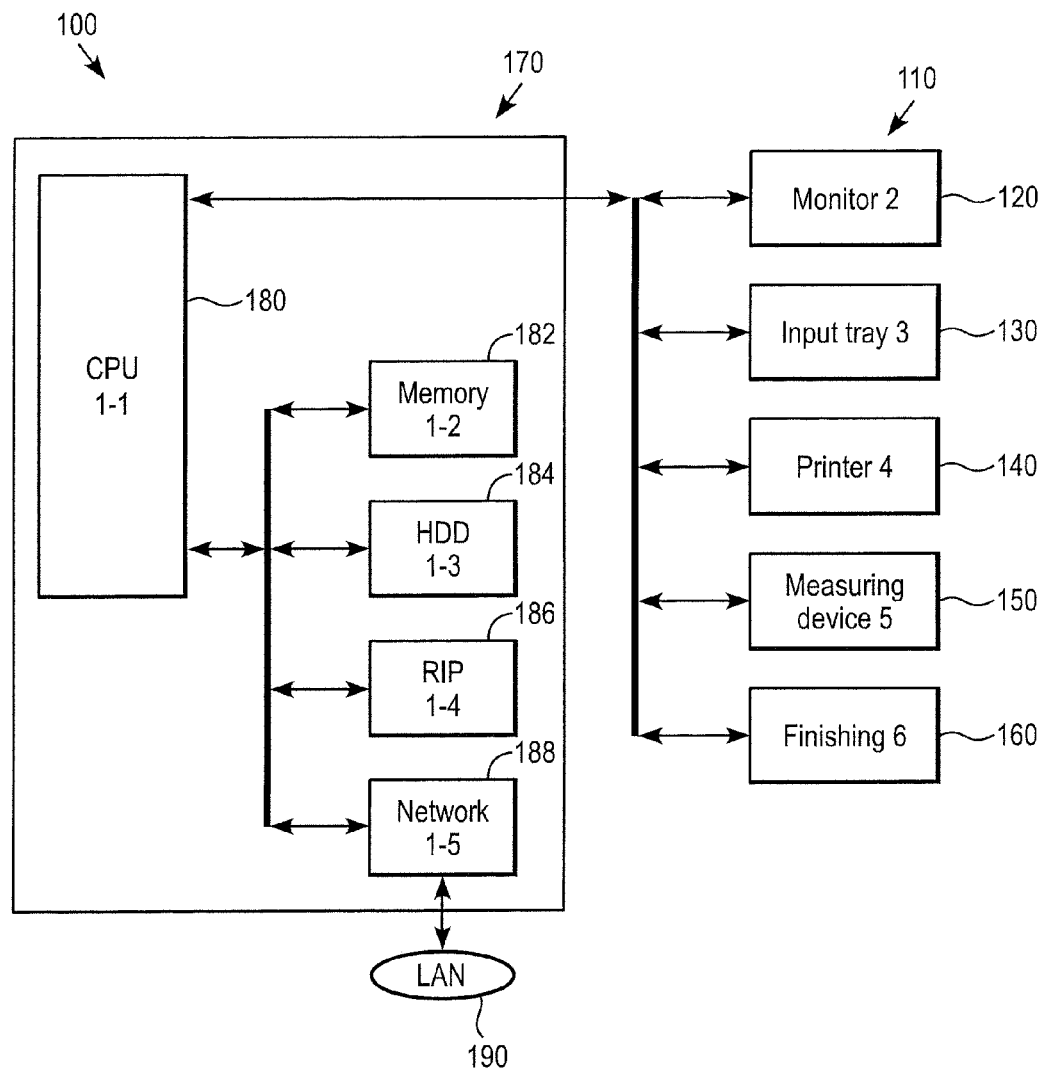
FIG. 1 is an illustration of a system including an image forming apparatus in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the color validation is a function to compare the colors between a target color and an actual color measured by a measuring device, for example, a color sensing device in the image forming apparatus. In the color validation, a plurality of color measurement pages, each of the plurality of color measurement pages having a plurality of color patches, are printed and measured by a measuring device. If the measured color does not match the target color, color corrections can then be made to the image forming apparatus.

The methods described herein can be implemented in an image forming system 100 that can include an image forming apparatus 110 preferably in the form of a multi-function peripheral (MFP) or printer, and a print controller 170. The print controller 170 can be a standalone controller, or, alternatively, a part of the image forming apparatus 110.

In accordance with an exemplary embodiment, the image forming apparatus or multi-function peripheral (or printer) 110 can include a user interface or monitor 120, a paper input tray 130, a printer or print engine 140, a measuring device 150, for example, one or more color sensors or colorimeters (not shown), such as an RGB scanner, a spectral scanner with a photo detector or other such sensing device known in the art, which can be embedded in the printed paper path, and an optional finishing apparatus or device 160.

The image forming apparatus 110 can be a printer, however, it is within the scope of the disclosure for the printing system 100 to be a copier. In accordance with an exemplary embodiment, the printer or print engine 140 has access to a print media (not shown) of various sizes and workflow for a print job, which can be, for example, stored in the input tray 130. A "print job" or "document" can be a set of related sheets, usually one or more collated copy sets copied from a set of original print job sheets or electronic document page images, from a particular user, or otherwise related. For submission of a regular print job (or customer job), digital data is generally sent to the printing system 100 from a client device (not shown) via a network connection 190.

For example, in accordance with an exemplary embodiment, an image processing section within the multi-function peripheral 110 can carry out various image processing under the control of the print controller 170, and sends the processed print image data to the print engine 140. The image processing section can also include a scanner section for optically reading a document, such as an image recognition system. The scanner section receives the image from the scanner and converts the image into a digital image. The print engine 140 forms an image on a recording sheet based on the image data sent from the image processing section.

The multi-function peripheral 110 can also include an auto feeding mechanism in input tray 130, wherein a user can feed one or more sheets or pages of a printed image, cover sheet of a package of print media and/or other documents to the image processing section for imaging and processing.

The print controller 170 can include a central processing unit (CPU) (or processor) 180, a memory 182, a hard disk drive (HDD) 184, a program for RIP processing (Raster Image Processing) 186, and a network connection unit or input/output (I/O) section 188. The RIP processing is a process for converting print data included in a print job into Raster Image data to be used in the printer or print engine 140. The CPU 180 can include a printer controller configured to process the data and job information received from the one or more client devices (not shown), for example, received via the network connection unit and/or input/output section (I/O section) 188.

The CPU 180 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices (not shown) to generate a print image.

The I/O section 188 performs data transfer with the client device. The printer controller can be programmed to process data and control various other components of the multi-function peripheral to carry out the various methods described herein. In accordance with an exemplary embodiment, the operation of printer section commences when it receives a page description from the one or more client devices (not shown) via I/O section 188 in the form of a print job data stream and/or fax data stream. The page description may be any kind of page description languages (PDLs), such as PostScript® (PS), Printer Control Language (PCL), Portable Document Format (PDF), and/or XML Paper Specification (XPS).

In accordance with an exemplary embodiment, the image forming apparatus or multi-function peripheral 110 and the one or more host devices (not shown) can be connected to one another via communication network 190, for example, a LAN. For example, the communication network 190 can be a public telecommunication line and/or a network (for example, LAN or WAN) 190. Examples of the communication network 190 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Examples of multi-function peripherals 110 consistent with exemplary embodiments of the invention include, but are not limited to, a multi-function peripheral (MFP), a laser beam printer (LBP), an LED printer, a multi-function laser beam printer including copy function. In accordance with an exemplary embodiment, the multi-function peripheral 110 is a color printer. In accordance with another embodiment, the multi-function peripheral 110 can be configured as a multi-function peripheral (MFP) device or all-in-one (AIO) that can include a printer section for converting print data inputted from outside to image data and forming and printing out the converted image onto a printable media, a scanner section for optically reading a document (for example, an image recognition system), and a facsimile section for facsimile receiving and transmitting image data to and from external apparatuses through public telecommunication lines.

In accordance with an exemplary embodiment, for the color validation of an image forming apparatus 100 can be performed by creating a color test pattern, for example, on the print controller 170, which can be, for example, a Digital Front End (DFE) printer controller that can be set based on one or more print conditions, for example, after a specific number of print copies have been printed by the image forming apparatus 100. With the validation setting enabled, the color measurement pages can be printed, and the one or more printed color patches to a corresponding target color for each of the one or more printed color patches. The color validation patch compared to the target color (or target color data) can determine the color rendering performance of print engine of the image forming apparatus 110. For example, if the color image quality has drifted and/or shifted, the data can be saved in a corresponding correction lookup table (LUT).

In accordance with an exemplary embodiment, the image forming apparatus 110 can have a color validation setting, which checks the printed colors of the one or more measurement pages, each of the one or more measurement pages having a plurality of color patches with a target color for each of the one or more color patches. The color validation setting can be enabled on the image forming apparatus, for example, when a predetermined number of sheets or pages have been printed by the image forming apparatus 110. In addition, the color validation setting can be enabled after a preset time or period, after servicing of the image forming apparatus and the like.

Figure 2:
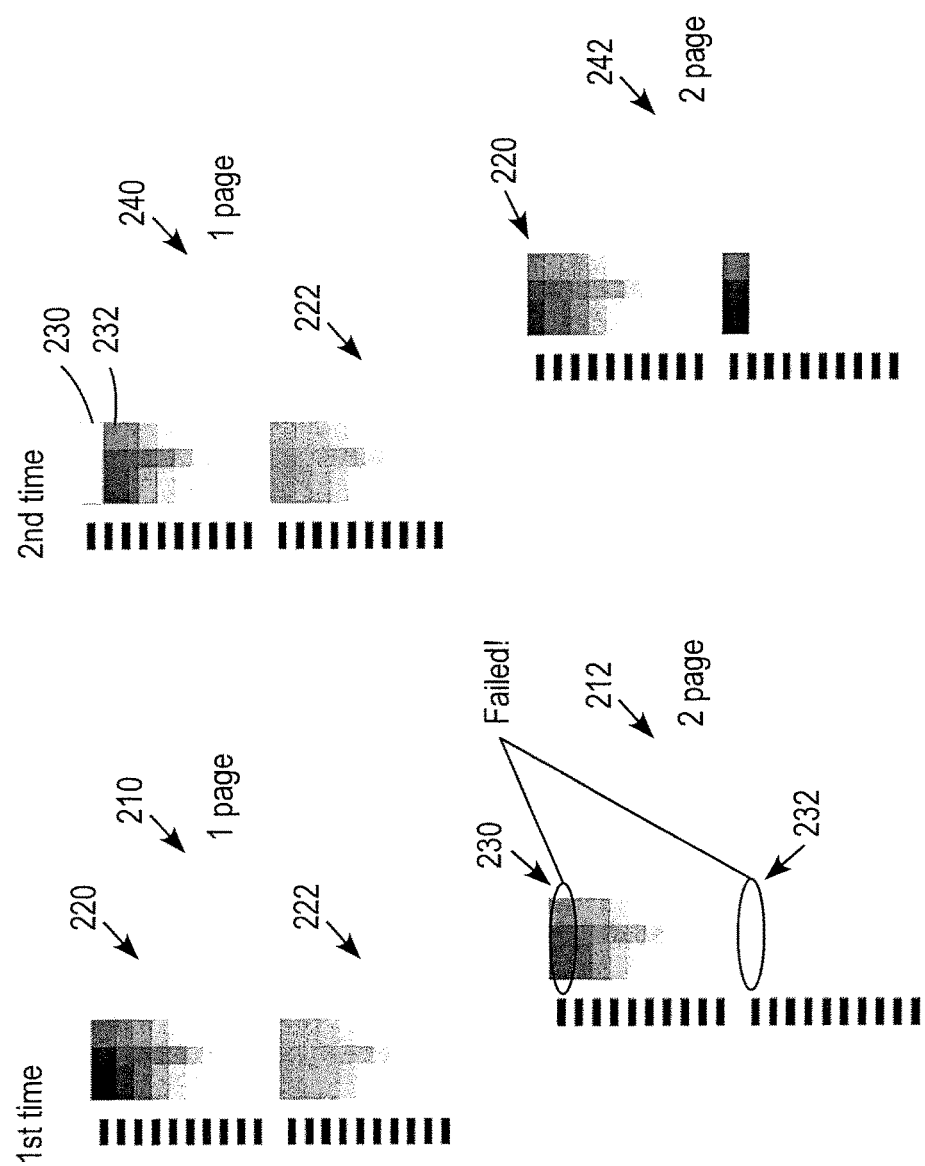
FIG. 2 is an illustration of a color chart, which includes a pair of measurement sheets having a plurality of color patches in accordance with an exemplary embodiment.

FIG. 2 is an illustration of a color chart 200, which includes a plurality of measurement sheets 210, 212, each of the plurality of measurement sheets 210, 212 having a plurality of color patches (or validation print stripes) 220, 222 in accordance with an exemplary embodiment. As shown in FIG. 2, the validation process can include the printing of a plurality of measurement sheets 210, 212, and wherein each of the plurality of measurement sheets 210, 212 has a plurality of color patches (or validation print stripes) 220, 222. The plurality of color patches are preferably read by an inline measuring device 150, The inline measuring device 150, for example, can be one or more inline color sensors (not shown), which are located in the paper path, and which feeds information to the CPU 170 for processing. The information received by the CPU (or processor) 170 from the measuring device 150 can be used to determine if one or more of the color patches 230, 232 have failed, i.e., at least one of the printed color patches as read by the inline measuring device 150 does not match a target color.

As shown in FIG. 2, in accordance with an exemplary embodiment, for example, after color validation, the image forming apparatus 110 performs a color calibration of the print engine, and a second color validation is performed, wherein the measurement sheets are reprinted and analyzed to determine, if one or more of the color patches does not match the target color.

In accordance with an exemplary embodiment, instead of printing the entire set of measurement sheets (or charts) in the order as originally printed ($1^{st}$ time), the second printing ($2^{nd}$ time) of the measurement sheets and the plurality of color patches can include, for example, the printing of the one or more color patches 230, 232 that previously failed first, and which may have a higher likelihood of failing again relative to those color patches that did not fail the first time. As shown in FIG. 2, the color patches 230, 232, which previously failed, for example, more recently, or in the previous color validation, can be moved and/or rearranged to be printed earlier, for example, on a first page of the measurements sheets 240, and if they fail during the printing process, the printing process can be stopped and the recalibrated without printing an entirety (i.e., each and every one) of the measurement sheets 240, 242.

In accordance with an exemplary embodiment, the processor or CPU 180 can be configured to maintain a history or log of color patches, and the order of the color patches within the plurality of measurement sheets 240, 242 can be based on the number of failures for each of the color patches within a defined time frame or parameter, for example, number of printed sheets.

In accordance with another exemplary embodiment, the order of the printing of the color patches can be based on a difference from the printed color patch and the target color, and wherein the color patches having the greatest (or largest) difference from the target color are printed first.

Figure 3:
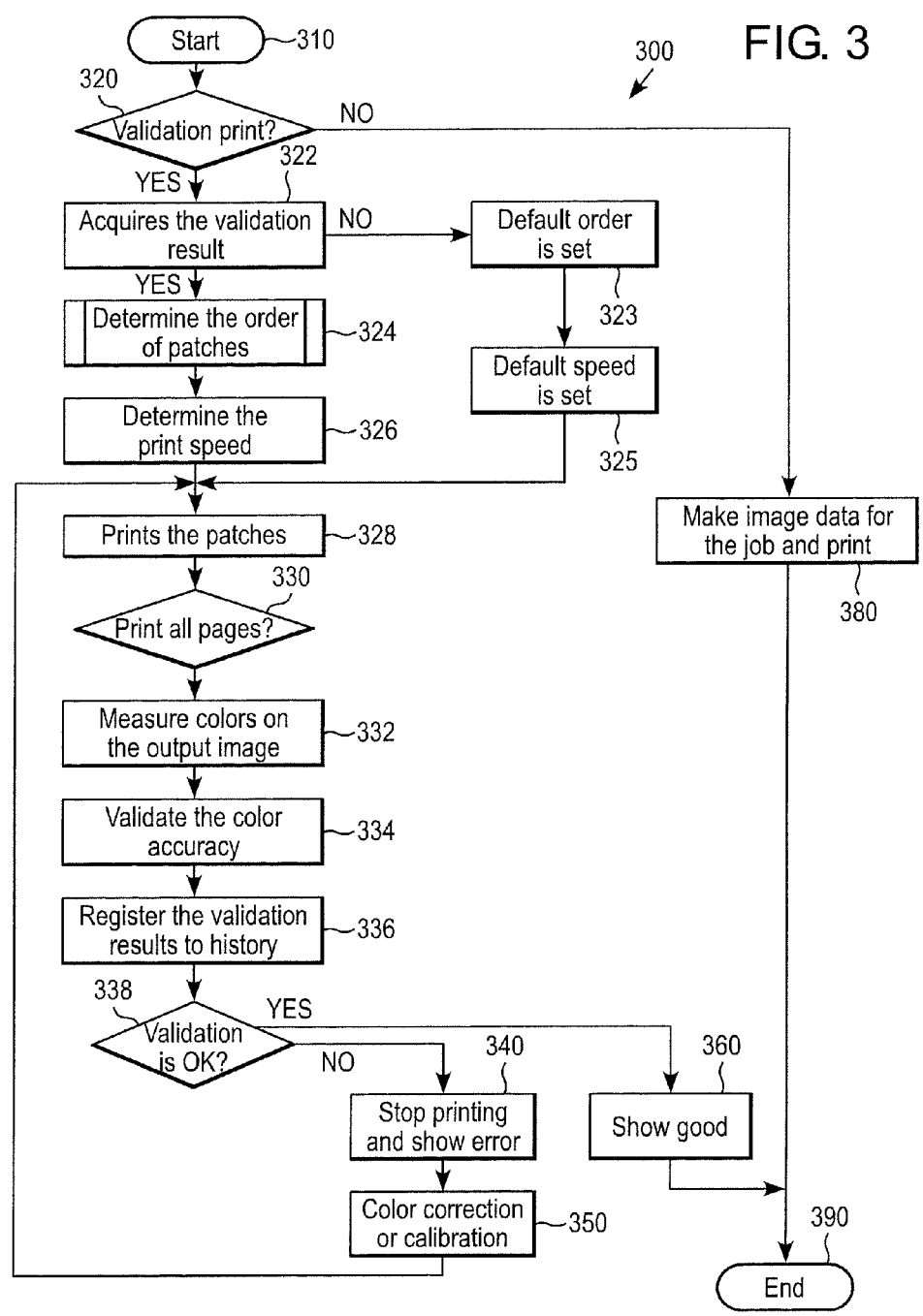
FIG. 3 is a flow chart illustrating a method and system for dynamically printing color patches for validation.

FIG. 3 is a flow chart 300 illustrating a method and system for dynamically printing color patches for validation. As shown in FIG. 3, the process starts in step 310 when the image forming apparatus receives a print job in the form of either a print request or print validation. In step 320, if the print job is a print request, for example, a print job having print data, the process continues to step 380, where the image forming apparatus generates an image data for the print job and prints the print job. Alternatively, if the print job is a print validation request, in step 320, the printed measurement pages 210, 212 include a plurality of color patches (or validation print stripes) 220, 222 as shown in FIG. 2, are printed and read, for example, by an in-line image or color sensor within the image forming apparatus 110. In accordance with an exemplary embodiment, the number of measurement sheets 210, 220 can be more than one, for example, 10 to 100 sheets.

In step 322, the previous or prior validation results (or history) are acquired from memory and read by the processor 180. Each of the one or more color patches (or validation patches) 220, 222 represents a portion of a color test pattern. In step 324, the order of the color patches is determined for each of the color patches in a second chart(s) or set of measurement pages 230, 232 based on the validation results from a first chart(s) or set of measurement pages 210, 212. For example, as set forth above, the order of color patches 240, 242 in the second chart(s) 230, 232 can be based on the color patches, which previously failed in the first chart(s) or set of measurement pages 210, 212, a frequency of color patch failure for each of the plurality of color patches 220, 222, and/or a color difference between the color patches 220, 222 and a corresponding target color.

However, in step 322, if no previous or prior validation results have been stored in memory for the print engine or printer 140, the process continues to step 323, where a default print order is set. In step 325, a default print speed is set and the process continues to step 328, where the color patches are printed as set forth. In accordance with an exemplary embodiment, the default speed is less than a print speed for a print job.

In accordance with an exemplary embodiment, in step 326, the print speed can be determined (FIG. 4) for the printing of the second chart(s), which can be performed after the color calibration of the print engine 140 in a revalidation step or process. In step 328, the printing of each of the color measurement pages 230, 232 begins in accordance with the order determined in step 324 and the print speed determined in step 326.

In step 330, each of the color measurement pages are printed. In step 332, the colors of the printed patches 240, 242 (output image) is measured. In step 334, the color accuracy of the printed patches 240, 242 is validated. In step 336, the validation results are registered to the history stored in the memory 172 of the image forming apparatus 110. In step 338, if the validation of at least one of the printed patches 240, 242 does not match the target color, the process continues to step 340, where the printing of the validation pages stops, and an error is shown. In step 350, the validation error is noted, and a color calibration or color correction can be performed on the print engine 140, and the process returns to step 328.

In accordance with an exemplary embodiment, if all of the pages 230, 232 are printed without a validation error, for example, each of the patches 240, 242 is within a target color, the process continues to step 360, where the validation is noted to be completed, and the process continues to step 390, where the process is completed (ends).

Figure 4:
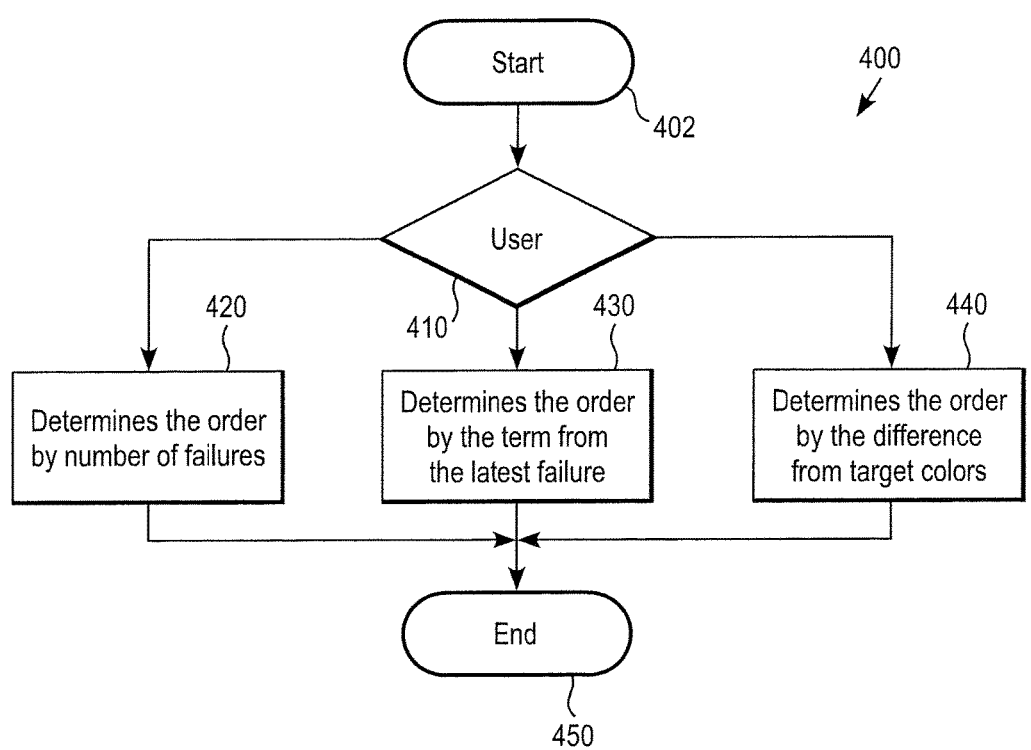
FIG. 4 is a flow chart illustrating a method and system for determining an order of printing of color patches in accordance with an exemplary embodiment.

FIG. 4 is a flow chart 400 illustrating a method and system for determining an order of printing of color patches, for example, as shown in step 324 of FIG. 3 in accordance with an exemplary embodiment. As shown in FIG. 4, the process starts in step 402 and continues to step 410, wherein a determination can be made based on a desired print order. For example, in step 420, the process determines the order based on the number of failures.

In accordance with an exemplary embodiment, for example, in step 420, the processor can be configured to log results from the first color validation chart and one or more previous validation charts, and then determines the order of each of the one or more patches based on an ascending order of failures for each of the one or more color patches that do not match the target color from the log results from the first color validation chart and the one or more previous validation charts.

In step 430, the processor can determine the order based on the term (or time) from the latest failure. As set forth in step 430, the processor can be configured to log each failure of the one or more patches in the first color validation chart, and determines the order of each of the one more patches based on an ascending order of detected failures for each of the one or more patches that do not match the target color.

In step 440, the process determines the order based a greatest or largest difference between the print color patch and the target color. For example, in step 440, the validation result can include a difference for each of the one or more patches in the first color validation chart from the target color, and the processor determines the order of each of the one or more patches in a descending order of the difference for each of the one or more patches in the first color validation chart from the target color In accordance with an exemplary embodiment, as set forth in step 420, 43, 440, the processor is configured to change the order of the one or more color patches in the first color validation chart based on one or more previous color validations when the one or more previous validations having at least one color patch that did not match the target color. In step 450, the process ends once an order for printing of the color patches has been determined.

Figure 5:
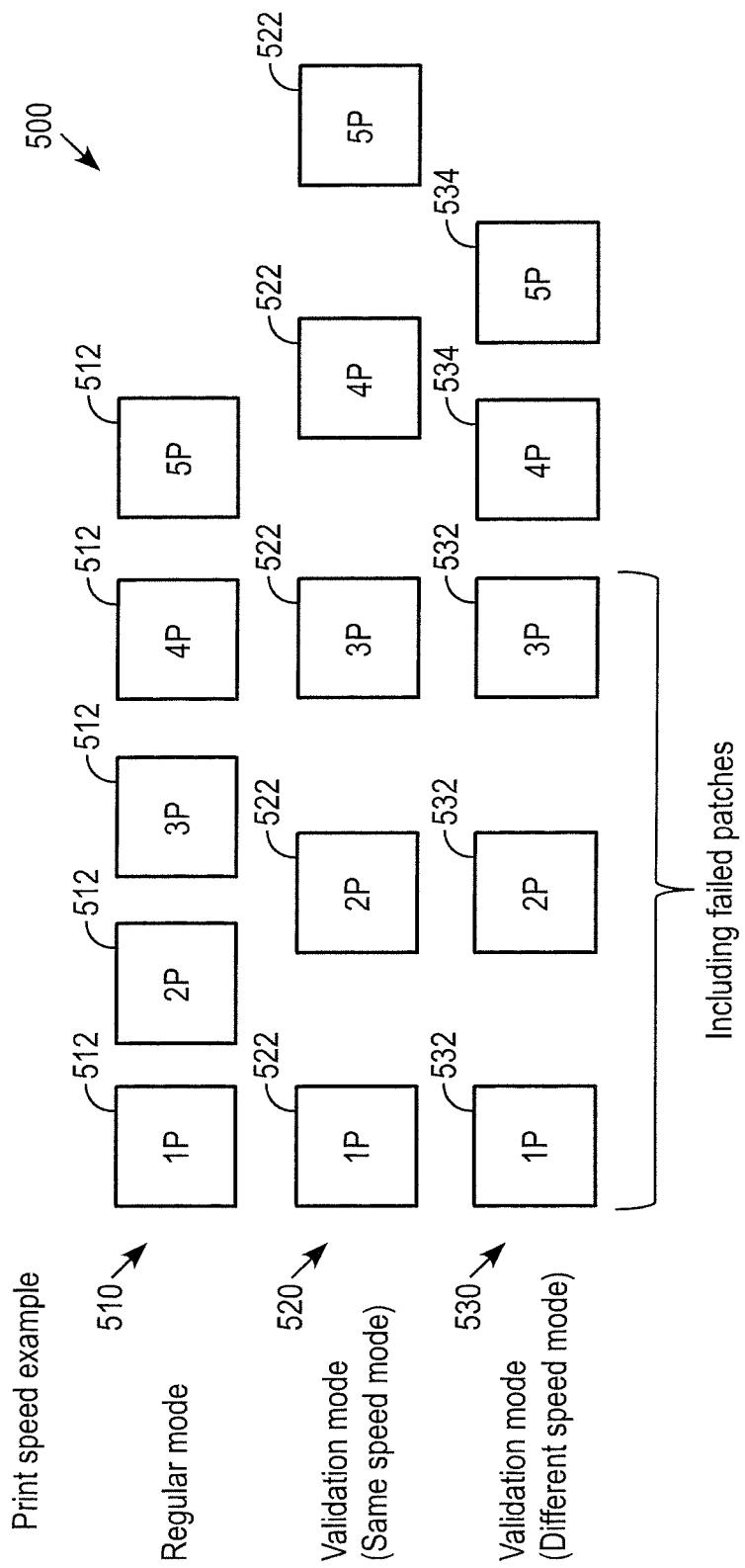
FIG. 5 is an illustration of a method of printing a plurality of color patches in accordance with an exemplary embodiment.

FIG. 5 is an illustration of a method 500 of adjusting print speed during color validation for a plurality of color patches in accordance with an exemplary embodiment. As shown in FIG. 5, in accordance with an exemplary embodiment, during the printing of a print job, or for example, the color measurement pages 512, each of the pages 512 are printed at a regular interval 510.

In accordance with an exemplary embodiment, in a validation mode 520, each of the color measurement pages 522 can be printed at the same time interval, i.e., the time between each printed page is the same and/or equal. In addition, the time interval between printings of each of the sheets can be increased as compared to the time interval as shown in the regular mode, i.e., the print speed is reduced or slower than the regular mode to allow processor or CPU time to analyze the printed color patches for errors.

In accordance with another exemplary embodiment, in a second validation mode 530, each of the color measurement pages 532, which previously including one or more failed color patches can be printed with an increased interval between sheets, i.e., at a reduced speed, and each of the color measurement pages 534 without failed color patches, can be printed at a faster or regular print speed.

In accordance with an exemplary embodiment, a non-transitory computer readable recording medium stored with a computer readable program code is disclosed for dynamically generating color patches for color validation of a print engine of an image forming apparatus, the computer readable program code configured to execute a process comprising: acquiring a validation result on a first color validation chart with a sensing device, the sensing device configured to read a color validation chart, the color validation chart having one or more color patches, and wherein the validation result compares a color accuracy of each of the one or more color patches from the first color validation chart to a target color; and determining an order of each of the color patches in a second color validation chart to be printed based on the validation result on the first color validation chart, wherein the order of the color patches in the second color validation chart is determined based on one or more color patches that do not match the target color.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image forming apparatus, comprising:
a sensing device configured to read a color validation chart, the color validation chart having one or more color patches; and
a processor configured to:
acquire a validation result on a first color validation chart from the sensing device, wherein the validation result compares a color accuracy of each of the one or more color patches from the first color validation chart to a target color; and
determine an order of each of the color patches in a second color validation chart to be printed based on the validation result on the first color validation chart, wherein the order of the color patches in the second color validation chart is determined based on an ascending order of failures for each of one or more color patches that do not match the target color; or
determine the order of each of the one or more patches in a descending order of a difference for each of the one or more patches in the first color validation chart from the target color.

2. The image forming apparatus according to claim 1, wherein the processor is configured to log results from the first color validation chart and one or more previous validation charts; and
the processor determines the order of each of the one or more patches based on the ascending order of failures for each of the one or more color patches that do not match the target color from the log results from the first color validation chart and the one or more previous validation charts.

3. The image forming apparatus according to claim 1, wherein the processor is configured to log each failure of the one or more patches in the first color validation chart; and the processor determines the order of each of the one more patches based on the ascending order of detected failures for each of the one or more patches that do not match the target color.

4. The image forming apparatus according to claim 1, wherein the validation result includes calculating the difference for each of the one or more patches in the first color validation chart from the target color; and
the processor determines the order of each of the one or more patches in the descending order of the difference for each of the one or more patches in the first color validation chart from the target color.

5. The image forming apparatus according to claim 1, wherein the image forming apparatus prints the second validation chart based on the determined order; and
the processor is configured to validate the color accuracy of each of the one or more color patches in the second color validation chart to the target color.

6. The image forming apparatus according to claim 1, wherein the processor has a default setting for printing the first validation chart if one or more previous validation results are not available.

7. The image forming apparatus according to claim 1, wherein the processor is configured to change the order of the one or more color patches in the first color validation chart based on one or more previous color validations, the one or more previous validations having at least one color patch that did not match the target color.

8. An image forming apparatus, comprising:
a sensing device configured to read a color validation chart, the color validation chart having one or more color patches; and
a processor configured to:
acquire a validation result on a first color validation chart from the sensing device, wherein the validation result compares a color accuracy of each of the one or more color patches from the first color validation chart to a target color;
determine an order of each of the color patches in a second color validation chart to be printed based on the validation result on the first color validation chart, wherein the order of the color patches in the second color validation chart is determined based on one or more color patches that do not match the target color;
determine a first print speed for at least one page of a validation mode, wherein the at least one page of the validation mode has at least one color patch that has previously failed, and the first print speed for the at least one page is slower than a second print speed.

9. The image forming apparatus according to claim 8, wherein the print speed for each of the pages, which do not include at least one color patch that failed to match the target color, is at the second print speed which is greater than the first print speed.

10. An image forming apparatus, comprising:
a sensing device configured to read a color validation chart, the color validation chart having one or more color patches; and
a processor configured to:
acquire a validation result on a first color validation chart from the sensing device, wherein the validation result compares a color accuracy of each of the one or more color patches from the first color validation chart to a target color;
determine an order of each of the color patches in a second color validation chart to be printed based on the validation result on the first color validation chart, wherein the order of the color patches in the second color validation chart is determined based on one or more color patches that do not match the target color;
print the second validation chart based on the determined order;
validate the color accuracy of each of the one or more color patches in the second color validation chart to the target color; and
stop the printing of remaining color patches in the second color validation chart, if one or more of the color patches in the second color validation chart do not match the target color.

11. A method for dynamically generating color patches for color validation of a print engine of an image forming apparatus, the method comprising:
acquiring a validation result on a first color validation chart with a sensing device, the sensing device configured to read a color validation chart, the color validation chart having one or more color patches, and wherein the validation result compares a color accuracy of each of the one or more color patches from the first color validation chart to a target color; and
determining an order of each of the color patches in a second color validation chart to be printed based on the validation result on the first color validation chart, wherein the order of the color patches in the second color validation chart is determined based on an ascending order of failures for each of one or more color patches that do not match the target color; or
determining the order of each of the one or more patches in a descending order of a difference for each of the one or more patches in the first color validation chart from the target color.

12. The method according to claim 11, comprising:
logging results from the first color validation chart and one or more previous validation charts; and
determining the order of each of the one or more patches based on the ascending order of failures for each of the one or more color patches that do not match the target color from the log results from the first color validation chart and the one or more previous validation charts.

13. The method according to claim 11, comprising:
logging each failure of the one or more patches in the first color validation chart; and
determining the order of each of the one more patches based on the ascending order of detected failures for each of the one or more patches that do not match the target color.

14. The method according to claim 11, comprising:
calculating the difference for each of the one or more patches in the first color validation chart from the target color; and
determining the order of each of the one or more patches in the descending order of the difference for each of the one or more patches in the first color validation chart from the target color.

15. The method according to claim 11, comprising:
determining a first print speed for at least one page of a validation mode, wherein the at least one page of the validation mode has at least one color patch that has previously failed, and the first print speed for the at least one page is slower than a second print speed, and wherein the print speed for each of the pages, which do not include at least one color patch that failed to match the target color, is at the second print speed which is greater than the first print speed.

16. The method according to claim 11, comprising:
printing the second validation chart based on the determined order;
validating the color accuracy of each of the one or more color patches in the second color validation chart to the target color; and
stopping the printing of remaining color patches in the second color validation chart, if one or more of the color patches in the second color validation chart do not match the target color.

17. A non-transitory computer readable recording medium stored with a computer readable program code for dynamically generating color patches for color validation of a print engine of an image forming apparatus, the computer readable program code configured to execute a process comprising:
acquiring a validation result on a first color validation chart with a sensing device, the sensing device configured to read a color validation chart, the color validation chart having one or more color patches, and wherein the validation result compares a color accuracy of each of the one or more color patches from the first color validation chart to a target color; and
determining an order of each of the color patches in a second color validation chart to be printed based on the validation result on the first color validation chart, wherein the order of the color patches in the second color validation chart is determined based on an ascending order of failures for each of one or more color patches that do not match the target color; or
determining the order of each of the one or more patches in a descending order of a difference for each of the one or more patches in the first color validation chart from the target color.

18. The computer readable recording medium according to claim 17, comprising:
logging results from the first color validation chart and one or more previous validation charts; and
determining the order of each of the one or more patches based on the ascending order of failures for each of the one or more color patches that do not match the target color from the log results from the first color validation chart and the one or more previous validation charts.

19. The computer readable recording medium according to claim 17, comprising:
logging each failure of the one or more patches in the first color validation chart; and
determining the order of each of the one more patches based on the ascending order of detected failures for each of the one or more patches that do not match the target color.

20. The computer readable recording medium according to claim 17, comprising:
calculating the difference for each of the one or more patches in the first color validation chart from the target color; and
determining the order of each of the one or more patches in the descending order of the difference for each of the one or more patches in the first color validation chart from the target color.

21. The computer readable recording medium according to claim 17, comprising:
determining a first print speed for at least one page of a validation mode, wherein the at least one page of the validation mode has at least one color patch that has previously failed, and the first print speed for the at least one page is slower than a second print speed, and wherein the print speed for each of the pages, which do not include at least one color patch that failed to match the target color, is at the second print speed which is greater than the first print speed.

* * * * *